(12) United States Patent
Kim (10) Patent No.: US 12,109,945 B2
(45) Date of Patent: *Oct. 8, 2024

(54) VIRTUAL ENGINE SOUND SYSTEM AND CONTROL METHOD FOR THE SAME

(71) Applicants: HYUNDAI MOTOR COMPANY, Seoul (KR); Kia Corporation, Seoul (KR)

(72) Inventor: Keun Jin Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 29 days.

This patent is subject to a terminal disclaimer.

(21) Appl. No.: 17/976,294

(22) Filed: Oct. 28, 2022

(65) Prior Publication Data

US 2023/0191991 A1    Jun. 22, 2023

(30) Foreign Application Priority Data

Dec. 16, 2021  (KR) .................. 10-2021-0180495

(51) Int. Cl.
*B60Q 5/00*     (2006.01)
*B60R 19/52*    (2006.01)

(52) U.S. Cl.
CPC .............. *B60Q 5/008* (2013.01); *B60R 19/52* (2013.01)

(58) Field of Classification Search
CPC ................ B60Q 5/008; G10K 11/004; G10K 11/17883; F01N 1/065; B60Y 2306/11
See application file for complete search history.

(56) References Cited

U.S. PATENT DOCUMENTS

| 11,872,936 B2* | 1/2024 | Noh ....................... H04R 1/02 |
| 2007/0182525 A1* | 8/2007 | McCarthy ............. G10K 15/02 |
| | | 340/425.5 |
| 2010/0245069 A1* | 9/2010 | Noro ...................... B60Q 5/008 |
| | | 340/441 |
| 2014/0055258 A1* | 2/2014 | Grosse-Budde ..... H04R 1/2803 |
| | | 340/463 |

FOREIGN PATENT DOCUMENTS

| KR | 20110122347 A | * | 5/2010 | ............... B60Q 5/00 |
| KR | 10-2011-0122347 A | | 11/2011 | |

* cited by examiner

*Primary Examiner* — Mirza F Alam
(74) *Attorney, Agent, or Firm* — MORGAN, LEWIS & BOCKIUS LLP (57) ABSTRACT

A virtual engine sound system includes a cooling module air guard, a virtual noise speaker generating a virtual noise inside the cooling module air guard, a radiator mounted inside the cooling module air guard, and an active air flap emitting the virtual noise between the cooling module air guard and the radiator to the outside.

9 Claims, 6 Drawing Sheets

| Formation length (m) | 0.5 | 0.4 | 0.3 | 0.2 |
|---|---|---|---|---|
| Multiple (n) | 340 | 272 | 204 | 136 |
| 2 | 680 | 544 | 408 | 272 |
| 3 | 1020 | 816 | 612 | 408 |
| 4 | 1360 | 1088 | 816 | 544 |
| 5 | 1700 | 1360 | 1020 | 680 |
| 6 | 2040 | 1632 | 1224 | 816 |
| 7 | 2380 | 1904 | 1428 | 952 |
| 8 | 2720 | 2176 | 1632 | 1088 |

VIRTUAL ENGINE SOUND SYSTEM AND CONTROL METHOD FOR THE SAME

CROSS-REFERENCE TO RELATED APPLICATION

The present application claims priority to Korean Patent Application No. 10-2021-0180495 filed on Dec. 16, 2021, the entire contents of which is incorporated herein for all purposes by this reference.

BACKGROUND OF THE PRESENT DISCLOSURE

Field of the Present Disclosure

The present disclosure relates to a virtual engine sound system and a control method for the same. More particularly, the present disclosure relates to a virtual engine sound system using an active air flap and a control method for the same.

DESCRIPTION OF RELATED ART

A virtual engine sound system (VESS) is mainly mounted on low-noise vehicles such as electric vehicles and hybrid vehicles (HEVs) to generate virtual noise to prevent pedestrian accidents. In the case of a low-noise vehicle, the VESS artificially generates noise to notify the vehicle approach because the sound is weak even if the vehicle approaches the pedestrian.

In general VESS-mounted vehicle, the speaker as a sound source is applied to the vehicle body or bumper, but there is a problem of inefficiency because the mount configuration is complicated due to interference with other parts and the size of the speaker system needs to be large for sound amplification.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a virtual engine sound system that utilizes an active air flap to smoothly transmit virtual noise without interference with other components and a control method for the same.

A virtual engine sound system according to various exemplary embodiments of the present disclosure may include a cooling module air guard, a virtual noise speaker generating a virtual noise inside the cooling module air guard, a radiator mounted inside the cooling module air guard, and an active air flap emitting the virtual noise between the cooling module air guard and the radiator to the outside.

The virtual engine sound system according to various exemplary embodiments of the present disclosure may further include at least two noise guide plates mounted inside the cooling module air guard to form a noise amplifying unit.

The noise guide plate may form at least two or more noise amplifying units.

The noise guide plate may form at least two noise amplifying units, and the formation length of at least one noise amplifying unit may be formed to be different from the formation length of at least another noise amplifying unit.

The maximum formation length of the noise amplifying unit may be 0.6 m or less.

The virtual engine sound system according to various exemplary embodiments of the present disclosure may further include a vehicle speed sensor configured for measuring speed of the vehicle and outputting a corresponding output signal, and a virtual noise controller configured for controlling operation of the virtual noise speaker, and wherein the virtual noise controller may be configured to control the virtual noise speaker to operate when a current vehicle speed is below a predetermined noise generation reference speed according to the output signal of the vehicle speed sensor.

The virtual engine sound system according to various exemplary embodiments of the present disclosure may further include an accelerator pedal sensor configured for measuring operation of an accelerator pedal and outputting a corresponding output signal, and wherein the virtual noise controller may be configured to control an output of the virtual noise speaker according to the output signal of at least one of the accelerator pedal sensor and the vehicle speed sensor.

The virtual engine sound system according to various exemplary embodiments of the present disclosure may further include a cooling fan module mounted behind the radiator, and a vehicle controller configured to control operation of the cooling fan module, and wherein when the virtual noise controller concludes that the cooling fan module is operated according to an output signal of the vehicle controller, the virtual noise controller may output an amplified fan operation output signal than an output signal generated when the cooling fan module does not operate.

The vehicle controller may be configured to control the operation of the active air flap, and wherein when the virtual noise controller concludes that the active air flap is closed according to the output signal of the vehicle controller, the virtual noise controller may output the signal to open the active air flap to the vehicle controller.

A control method for a virtual engine sound system including a cooling module air guard, a virtual noise speaker that generates virtual noise inside the cooling module air guard, a radiator mounted inside the cooling module air guard, an active air flap that radiates out virtual noise between the cooling module air guard and the radiator, at least two noise guide plates mounted inside the cooling module air guard to form a noise amplifying unit, a vehicle speed sensor that measures the speed of the vehicle and outputs the corresponding output signal, and a virtual noise controller to control the operation of the virtual noise speaker, the control method according to various exemplary embodiments of the present disclosure may include controlling, by the virtual noise controller, to operate the virtual noise speaker when a current vehicle speed is less than or equal to a predetermined noise generation reference speed according to the output signal of the vehicle speed sensor.

The virtual engine sound system may further include a cooling fan module mounted on rear of the radiator, and a vehicle controller to control the operation of the cooling fan module, wherein, the control method may further include when the virtual noise controller determines that the cooling fan module is operated according to the output signal of the vehicle controller, outputting an amplified fan operation output signal than an output signal generated when the cooling fan module does not operate.

The vehicle controller may be configured to control the operation of the active air flap, and wherein when the virtual noise controller concludes that the active air flap is closed according to the output signal of the vehicle controller, the virtual noise controller may output the signal to open the active air flap to the vehicle controller.

According to the virtual engine sound system and the control method for the same according to various exemplary embodiments of the present disclosure, it is possible to smoothly transmit virtual noise without interference with other components using an active air flap.

According to the virtual engine sound system and the control method for the same according to various exemplary embodiments of the present disclosure, it is possible to generate noise in various areas using a noise guide plate, improving pedestrian attention.

According to the virtual engine sound system and the control method for the same according to various exemplary embodiments of the present disclosure, it is possible to improve pedestrian attention through noise control according to vehicle speed.

Furthermore, the effects which may be obtained or predicted by various exemplary embodiments of the present disclosure will be included directly or implicitly in the detailed description of various exemplary embodiments of the present disclosure. That is, various effects predicted according to various exemplary embodiments of the present disclosure will be included within a detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

Because the size and thickness of each component shown in the drawing are arbitrarily indicated for convenience of explanation, the present disclosure is not necessarily limited to the one shown in the drawing, and the thickness is enlarged to clearly express various parts and areas.

Furthermore, in the detailed description below, the reason for dividing the names of components into first, second, etc. is to classify them in a same relationship, and it is not necessarily limited to the order in the following description.

Throughout the specification, when a part includes a certain element, it means that other elements may be further included, rather than excluding other elements, unless specifically stated otherwise.

Furthermore, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

Figure 1:
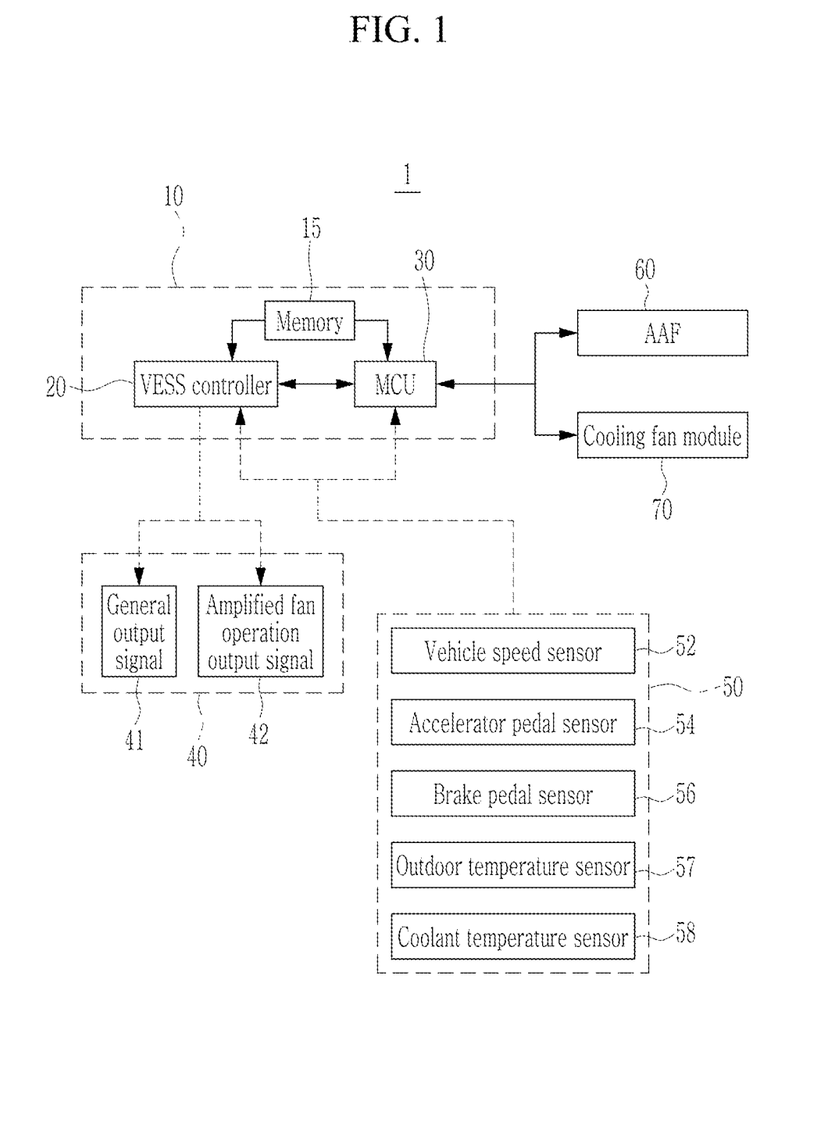
FIG. 1 is a schematic diagram of a virtual engine sound system according to various exemplary embodiments of the present disclosure.
Figure 2:
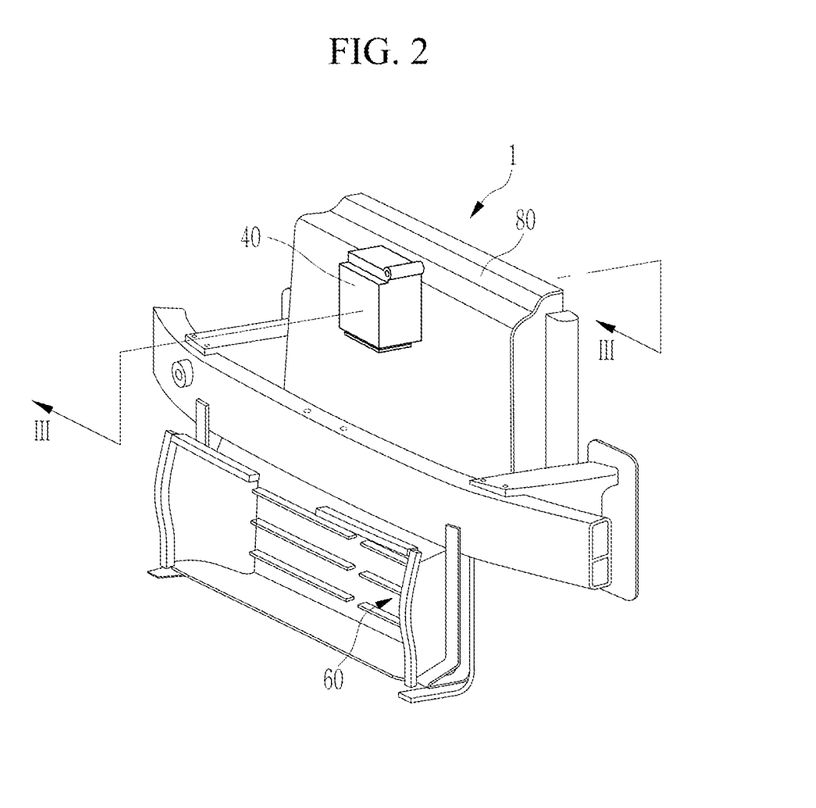
FIG. 2 is a perspective view of a virtual engine sound system according to various exemplary embodiments of the present disclosure.
Figure 3:
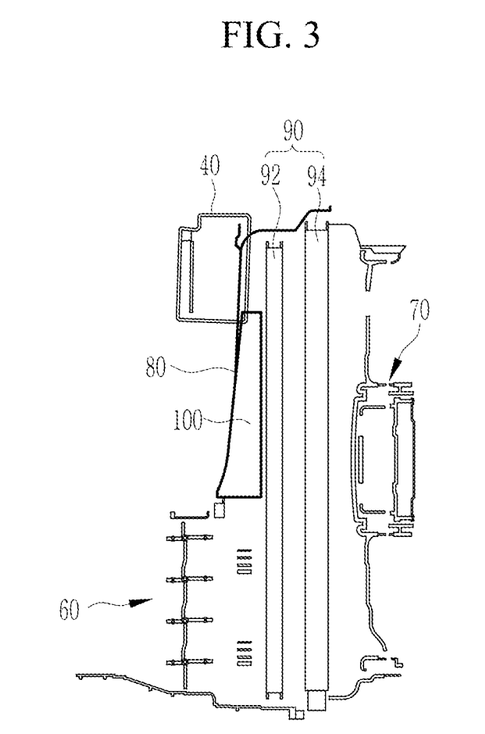
FIG. 3 is a cross-sectional view along the III-III line of FIG. 2.

FIG. 1 is a schematic diagram of a virtual engine sound system according to various exemplary embodiments of the present disclosure, FIG. 2 is a perspective view of a virtual engine sound system according to various exemplary embodiments of the present disclosure, and FIG. 3 is a cross-sectional view along the III-III line of FIG. 2.

Referring to FIG. 1 to FIG. 3, a virtual engine sound system 1 according to various exemplary embodiments of the present disclosure may include a cooling module air guard 80, a radiator 90 mounted inside the cooling module air guard 80 and an active air flap 60 (AAF; Active Air Flap).

The cooling module air guard 80 is provided in front of the radiator 90 to shield the radiator 90, preventing external air from being directly delivered to the radiator 90.

Through this, it is possible to warm up the engine rapidly at starting and reduce air resistance.

The radiator 90 is a general configuration for cooling or heating heat-exchange objects such as an engine, a drive motor, a heater, an oil warmer, and an oil cooler by heat-exchanging them.

For example, the radiator 90 may include a first radiator 92 that exchanges heat with the heat-exchange target and a second radiator 94 that exchanges heat with the engine. However, it is not limited thereto, and various numbers or various radiators may be disposed according to the heat exchange requirement configuration and heat exchange capacity of the vehicle.

The active air flap 60 opens or closes depending on the vehicle's speed or the temperature condition of the heat-exchange target, allowing outside air to be delivered to the radiator 90.

The virtual engine sound system 1 according to various exemplary embodiments of the present disclosure may further include a virtual noise speaker 40 that generates a virtual noise to inside the cooling module air guard 80, and the active air flap 60 emits the virtual noise between the cooling module air guard 80 and the radiator 90 to the outside.

The virtual noise emitted by the virtual noise speaker 40 may be amplified in the space between the cooling module air guard 80 and the radiator 90 and emitted to the outside through the active air flap 60 to alert pedestrians outside the vehicle.

The virtual engine sound system 1 according to various exemplary embodiments of the present disclosure may be applied to an electric vehicle (EV) with relatively small noise as well as may be applied to a hybrid electric vehicle (HEV) driven by a motor at a relatively low speed, for example, 30 Km/h or less even if the engine is applied.

The virtual engine sound system 1 according to various exemplary embodiments of the present disclosure may include a virtual noise controller 20 (or VESS controller) for controlling the operation of the virtual noise speaker 40.

The virtual engine sound system 1 according to various exemplary embodiments of the present disclosure may further include a cooling fan module 70 mounted to the rear of the radiator 90.

The cooling fan module 70 includes a motor operated according to the temperature state of the heat exchange target, and may control the heat-exchange rate of the radiator 90 according to the motor operation.

The virtual engine sound system 1 according to various exemplary embodiments of the present disclosure may include a vehicle controller 30 (MCU; Micro Computer Unit) for controlling the operation of the active air flap 60 and the cooling fan module 70.

The virtual noise controller 20 and the vehicle controller 30 may each be implemented as at least one microprocessor operating according to a predetermined program, and the predetermined program may include a series of instructions for performing a method according to various exemplary embodiments of the present disclosure to be described later.

An exemplary embodiment of the virtual engine sound system 1 according to an exemplary embodiment of the present disclosure may further include a memory 15, and a series of instructions for performing a method according to various exemplary embodiments of the present disclosure to be described later may be stored in the memory 15.

A virtual engine sound system 1 according to various exemplary embodiments of the present disclosure may include a controller 10, and the controller 10 may include the virtual noise controller 20 and the vehicle controller 30.

That is, the virtual noise controller 20 and the vehicle controller 30 are separate and separate components, and may perform separate operations, but the single controller 10 may function as the virtual noise controller 20 and the vehicle controller 30.

In the detailed description and claim, the virtual noise controller 20 and the vehicle controller 30 are referred to as separate configurations, but it is natural that one controller 10 may perform the corresponding function.

The virtual engine sound system 1 according to various exemplary embodiments of the present disclosure may include a vehicle operating status signal unit 50 which is configured to measure the operation state of the vehicle and outputs a corresponding output signal. The output signal of the vehicle operating status signal unit 50 is input to the virtual noise controller 20 and the vehicle controller 30, and the virtual noise controller 20 and the vehicle controller 30 may control the operation of the virtual noise speaker 40, the active air flap 60 and the cooling fan module 70, respectively.

The vehicle operating status signal unit 50 may include a vehicle speed sensor 52 which is configured to measure the speed of the vehicle and outputs a corresponding output signal, and the virtual noise controller 20 may control the operation of the virtual noise speaker 40 according to an output signal of the vehicle speed sensor 52.

For example, when the current vehicle speed corresponds to the noise generation reference speed according to the output signal of the vehicle speed sensor 52, the virtual noise controller 20 may control the virtual noise speaker 40 to operate.

For example, the noise generation reference speed may be 30 Km/h, but is not limited thereto, and may be determined in consideration of national/regional regulations or pedestrian safety.

The vehicle operating status signal unit 50 may further include an accelerator pedal sensor 54 which is configured to measure the operation of the accelerator pedal and outputs a corresponding output signal, and a brake pedal sensor 56 which is configured to measure the operation of the brake pedal and outputs a corresponding output signal.

Furthermore, the vehicle operating status signal unit 50 may further include various sensors required for the operation of the vehicle, such as an outdoor temperature sensor 57 which is configured to measure the outside temperature and outputs a corresponding output signal, and a coolant temperature sensor 58 which is configured to measure the coolant temperature and outputs a corresponding output signal.

The virtual noise controller 20 may control the output of the virtual noise speaker 40 according to an output signal of the accelerator pedal sensor 54 and/or the vehicle speed sensor 52.

For example, when the vehicle is starting from a standstill, it can warn pedestrians with a relatively loud noise, and when a warning is required to pedestrians using a relatively loud noise, such as when the vehicle speed is relatively fast or when accelerating, the virtual noise speaker 40 may be controlled to generate a relatively large output.

When the virtual noise controller 20 determines that the cooling fan module 70 is operated according to the output signal of the vehicle controller 30, the fan operation output signal 42 amplified than the general output signal 41 when the cooling fan module 70 does not operate may be output.

The output signal 41 when the cooling fan module 70 does not operate and the amplified fan operation output signal 42 may be pre-stored in the memory 15.

The vehicle controller 30 may control the operation of the active air flap 60. When the virtual noise controller 20 determines that the active air flap 60 is closed according to the output signal of the vehicle controller 30 and the operation of the virtual noise speaker 40 is required, the virtual noise controller 30 may output the corresponding output signal to open the active air flap 60 to the vehicle controller 30.

Figure 4:
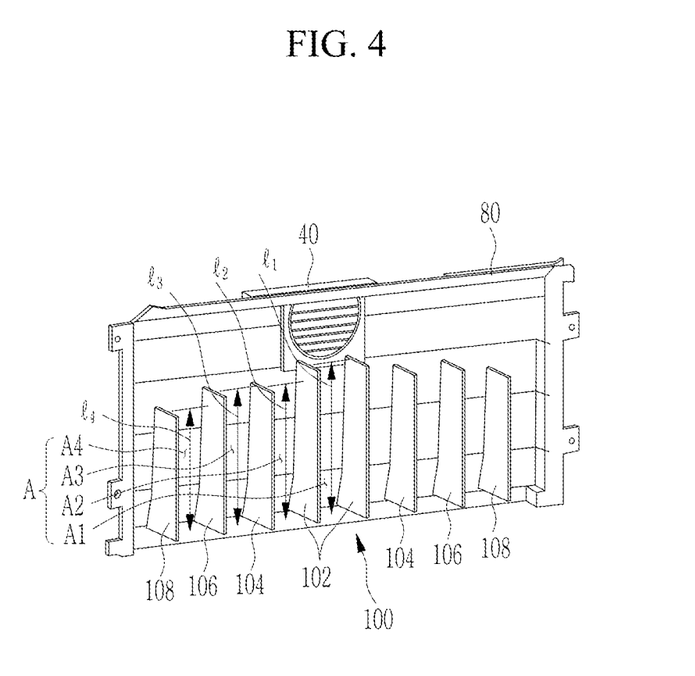
FIG. 4 is a partial perspective view of a virtual engine sound system according to various exemplary embodiments of the present disclosure.

FIG. 4 is a partial perspective view of a virtual engine sound system according to various exemplary embodiments of the present disclosure.

Referring to FIG. 3 and FIG. 4, the virtual engine sound system 1 according to various exemplary embodiments of the present disclosure may further include at least two noise guide plates 100 mounted inside the cooling module air guard 80 to form a noise amplifying unit A.

The noise amplifying unit A may be defined as a space formed inside the radiator 90, the cooling module air guard 80 and the guide plate 100, and the virtual noise generated by the virtual noise speaker 40 is amplified in the noise amplifying unit A and it may be radiated to the outside through an active air flap 60.

In FIG. 4, as an example of the noise guide plate 100, the first, second, third, and fourth plates 102, 104, 106, and 108 disposed in the vehicle body height direction are shown, but the number of the noise guide plate 100 is not limited thereto.

The noise guide plate 100 may form at least two or more noise amplifying units A.

The formation length of at least one noise amplifying unit A may be formed to be different from the formation length of at least another noise amplifying unit A.

For example, in FIG. 4, the first, second, third, and fourth plates 102, 104, 106 and 108 are disposed to form the first, second, third, and fourth noise amplifiers A1, A2, A3 and A4. According to difference in length of the first, second, third, and fourth plates 102, 104, 106 and 108, the lengths l1, l2, l3, and l4 of the first, second, third, and fourth noise amplifiers A1, A2, A3 and A4 are formed to be sequentially smaller in the outward direction. However, the exemplary embodiment of the present disclosure is not limited thereto, and the lengths l1, l2, l3, and l4 of the first, second, third, and fourth noise amplifiers A1, A2, A3, and A4 may have various lengths and various arrangements.

In the detailed description and claims, the lengths l1, l2, l3, and l4 of the first, second, third, and fourth noise amplifying units A1, A2, A3, and A4 may be defined as the length by forming of any one plate of the first, second, third, and fourth plates 102, 104, 106, 108 and an adjacent plate.

Figure 5:
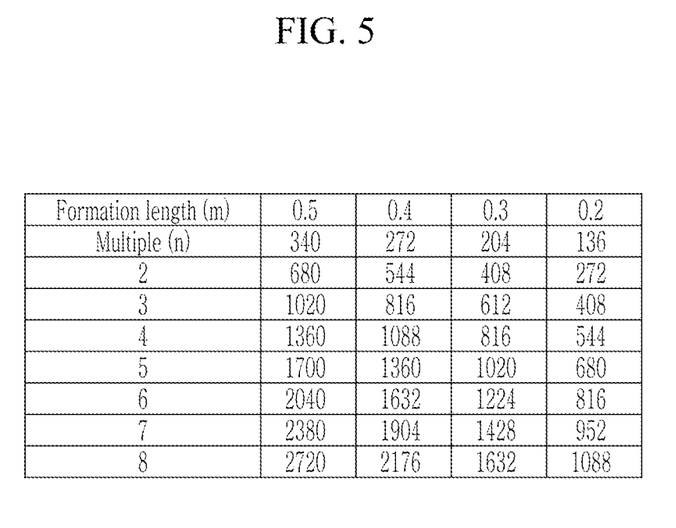
FIG. 5 is a table showing a frequency region which may be generated by a virtual engine sound system according to various exemplary embodiments of the present disclosure.

FIG. 5 is a table showing a frequency region which may be generated by a virtual engine sound system according to various exemplary embodiments of the present disclosure.

In FIG. 5, the result of roughly determining the frequency (Hz) which may be amplified according to the length of the tube is shown.

As shown in FIG. 5, in the exemplary embodiment of the present disclosure of the virtual engine sound system 1, when the length l1, l2, l3, and l4 of the first, second, third, and fourth noise amplifiers A1, A2, A3, and A4 is set to 0.5M, 0.4M, 0.3M, 0.2M, it may be seen that it covers most of the general virtual sound regulation frequency range.

The maximum formation length l1 of the noise amplifying unit A may be 0.6 m or less, and through this, virtual noise generation in various areas is possible without significantly increasing the entire height of the noise amplifying unit A.

Figure 6:
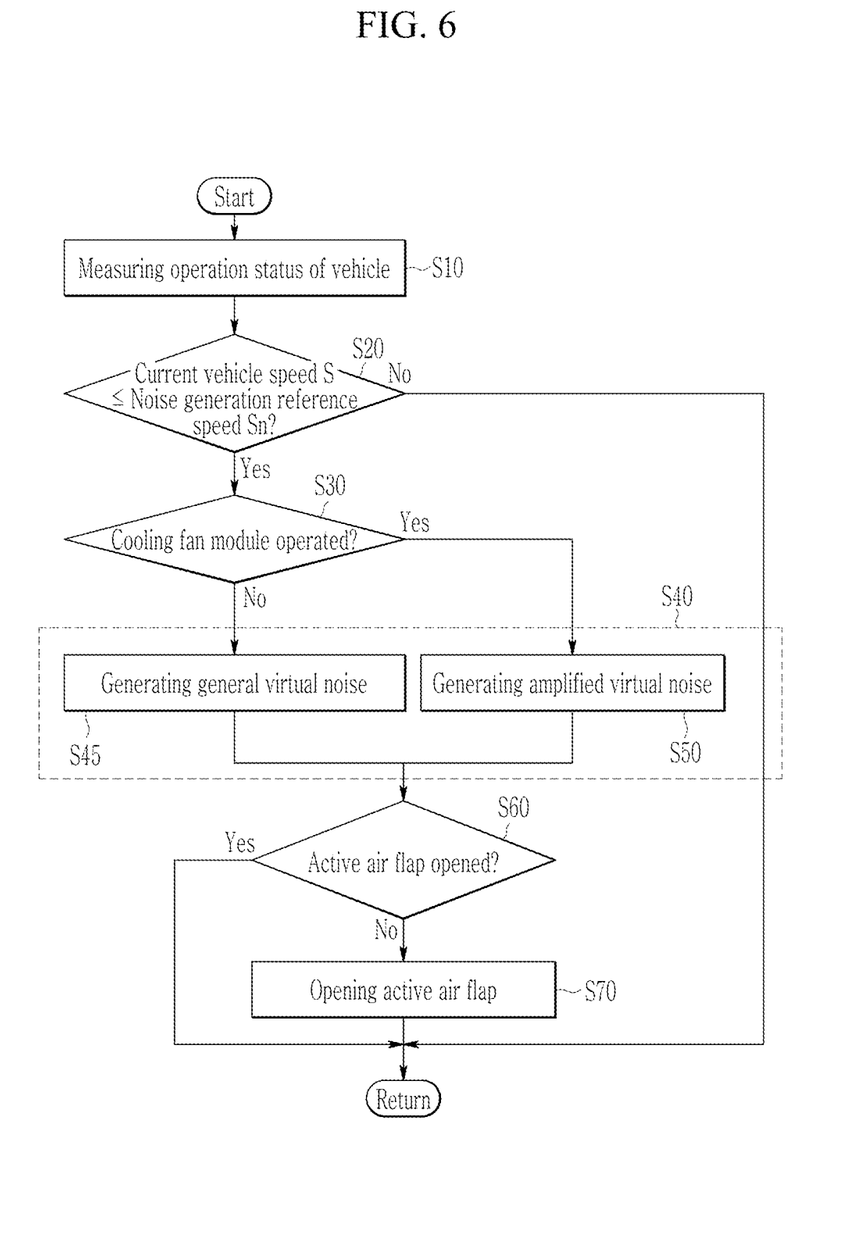
FIG. 6 is a flowchart showing a virtual engine sound system control method according to various exemplary embodiments of the present disclosure.

FIG. 6 is a flowchart showing a virtual engine sound system control method according to various exemplary embodiments of the present disclosure.

Hereinafter, referring to FIG. 1 to FIG. 6, the virtual engine sound system control method according to various exemplary embodiments of the present disclosure will be described.

The virtual engine sound system control method according to various exemplary embodiments of the present disclosure may be applied to the virtual engine sound system 1 according to various exemplary embodiments of the present disclosure described above.

In the virtual engine sound system control method according to various exemplary embodiments of the present disclosure, the vehicle operating status signal unit 50 measures the operation status of the vehicle and outputs the corresponding output signal, and the output signal is input to the controller 10 or the virtual noise controller 20 and the vehicle controller 30 at step S10.

The controller 10 or the virtual noise controller 20 compares the current vehicle speed S and the predetermined noise generation reference speed Sn according to the output signal of the vehicle speed sensor 52 at step S20, and when the current vehicle speed S is less than the noise generation reference speed Sn, the virtual noise speaker 40 is operated at step S40.

The virtual engine sound system 1 may further include the cooling fan module 70 mounted on rear of the radiator 90 and the vehicle controller 30 for controlling the operation of the cooling fan module 70.

In the virtual engine sound system control method according to various exemplary embodiments of the present disclosure, the virtual noise controller 20 determines whether the cooling fan module 70 is operated or not according to the output signal of the vehicle controller 30 at step S30, and when it is determined that the cooling fan module 70 does not operate, the virtual noise controller 20 outputs the general output signal 41 to generate the general virtual noise of the virtual noise speaker 40 at step S45.

When it is determined that the cooling fan module 70 is operated, the virtual noise controller 20 outputs the amplified output signal 42 so that the virtual noise speaker 40 generates amplified virtual noise at step S50.

When the cooling fan module 70 is operated, the air flows in the radiator 90 direction by operation of the cooling fan module 70 so that the virtual noise of the noise amplifying unit A emitted to the outside may be suppressed.

Accordingly, when the cooling fan module 70 is operated, the virtual noise controller 20 is configured to control the operation of the virtual noise speaker 40 to generate the amplified virtual noise at step S50.

The vehicle controller 30 may control the operation of the active air flap 60, and the operation of the active air flap 60 is determined by the output signal of the vehicle operating status signal unit 50 including the vehicle speed sensor 52, the accelerator pedal sensor 54, the outside temperature sensor 57, the cooling coolant temperature sensor 58 and the like, and which may be stored in advance in the memory 15 in a form of a map.

The virtual noise controller 20 determines whether the active air flap 60 is open according to the output signal of the vehicle controller 30 or the vehicle operating status signal unit 50 at step S60, and when it is determined that the active air flap 60 is closed, the virtual noise controller 20 may output a corresponding output signal to the vehicle controller 30 to force open the active air flap 60 at step S70.

That is, if the active air flap 60 is closed and the virtual noise generation condition is met in a low-speed condition, etc., the active air flap 60 may be forcibly opened to warn a pedestrian.

As described above, according to the virtual engine sound system and the control method for the same, it is possible to smoothly transmit virtual noise without interference with other components by use of an active air flap.

According to the virtual engine sound system and the control method for the same according to various exemplary embodiments of the present disclosure, it is possible to generate noise in various sound ranges using a noise guide plate, improving pedestrian attention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A virtual engine sound system including:
a cooling module air guard;
a virtual noise speaker generating a virtual noise inside the cooling module air guard;
a radiator mounted inside the cooling module air guard;
an active air flap emitting the virtual noise between the cooling module air guard and the radiator to the outside;
a vehicle speed sensor configured for measuring a speed of a vehicle and outputting a corresponding output signal;
a virtual noise controller configured for controlling operation of the virtual noise speaker;
a cooling fan module mounted behind the radiator; and
a vehicle controller configured to control operation of the cooling fan module,
wherein the virtual noise controller is configured to control the virtual noise speaker to operate when a current vehicle speed is below a predetermined noise generation reference speed according to the output signal of the vehicle speed sensor, and
wherein when the virtual noise controller concludes that the cooling fan module is operated according to an output signal of the vehicle controller, the virtual noise controller is configured to output an amplified fan operation output signal than an output signal generated when the cooling fan module does not operate.

2. The virtual engine sound system of claim 1, further including:
at least two noise guide plates mounted inside the cooling module air guard to form a noise amplifying unit.

3. The virtual engine sound system of claim 2, wherein the at least two noise guide plates form at least two or more noise amplifying units.

4. The virtual engine sound system of claim 2,
wherein the at least two noise guide plates form at least two noise amplifying units, and
wherein a formation length of at least one noise amplifying unit is formed to be different from a formation length of at least another noise amplifying unit.

5. The virtual engine sound system of claim 4, wherein a maximum formation length of each noise amplifying unit is 0.6 m or less than 0.6m.

6. The virtual engine sound system of claim 1, further including
an accelerator pedal sensor configured for measuring operation of an accelerator pedal and outputting a corresponding output signal,
wherein the virtual noise controller is configured to control an output of the virtual noise speaker according to the output signal of at least one of the accelerator pedal sensor and the vehicle speed sensor.

7. The virtual engine sound system of claim 1,
wherein the vehicle controller is configured to control operation of the active air flap, and
wherein when the virtual noise controller concludes that the active air flap is closed according to the output signal of the vehicle controller, the virtual noise controller is configured to output a signal to open the active air flap to the vehicle controller.

8. A control method for a virtual engine sound system including a cooling module air guard, a virtual noise speaker that generates virtual noise inside the cooling module air guard, a radiator mounted inside the cooling module air guard, an active air flap that radiates out the virtual noise between the cooling module air guard and the radiator, at least two noise guide plates mounted inside the cooling module air guard to form a noise amplifying unit, a vehicle speed sensor that measures a speed of a vehicle and outputs a corresponding output signal, and a virtual noise controller to control operation of the virtual noise speaker, the control method including:
- controlling, by the virtual noise controller, to operate the virtual noise speaker when a current vehicle speed is less than or equal to a predetermined noise generation reference speed according to the output signal of the vehicle speed sensor,
- wherein the virtual engine sound system further includes a cooling fan module mounted on rear of the radiator, and a vehicle controller to control operation of the cooling fan module,
- wherein, the control method further includes:
- when the virtual noise controller determines that the cooling fan module is operated according to an output signal of the vehicle controller, outputting an amplified fan operation output signal than an output signal generated when the cooling fan module does not operate.

9. The control method of claim 8,
- wherein the vehicle controller is configured to control operation of the active air flap, and
- wherein when the virtual noise controller concludes that the active air flap is closed according to the output signal of the vehicle controller, the virtual noise controller is configured to output a signal to open the active air flap to the vehicle controller.

* * * * *